(12) United States Patent
Alsina et al.

(10) Patent No.: US 8,949,935 B2
(45) Date of Patent: Feb. 3, 2015

(54) SECURE ACCOUNT CREATION

(71) Applicant: Apple Inc., Cupertino, CA (US)

(72) Inventors: Thomas Alsina, Paris (FR); Michael K. Chu, Cupertino, CA (US); Augustin J. Farrugia, Los Altos Hills, CA (US); Gianpaolo Fasoli, Redwood City, CA (US); Sean B. Kelly, Cupertino, CA (US); Delfin Jorge Rojas, San Jose, CA (US); Nicholas T. Sullivan, San Francisco, CA (US); Zhiyuan Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 13/732,056

(22) Filed: Dec. 31, 2012

(65) Prior Publication Data

US 2014/0082695 A1    Mar. 20, 2014

Related U.S. Application Data

(60) Provisional application No. 61/703,736, filed on Sep. 20, 2012.

(51) Int. Cl.
*H04L 9/32* (2006.01)
*H04L 9/00* (2006.01)
*H04L 29/06* (2006.01)

(52) U.S. Cl.
CPC ............. *H04L 63/08* (2013.01); *H04L 29/06* (2013.01)
USPC .............. 726/2; 726/3; 713/168; 713/176

(58) Field of Classification Search
CPC . H04L 63/08; H04L 63/0823; H04L 63/0876; H04L 9/3236; H04L 9/3244; G06Q 20/382; G06Q 20/3825; G06Q 20/3827

USPC ............. 713/168, 181, 176; 726/1–3, 10; 705/64, 75

See application file for complete search history.

(56) References Cited

U.S. PATENT DOCUMENTS 6,330,677 B1 * 12/2001 Madoukh ................. 726/2
7,100,049 B2   8/2006 Gasparini et al.
(Continued)

FOREIGN PATENT DOCUMENTS

EP    1843274 A2    10/2007

*Primary Examiner* — Hosuk Song
(74) *Attorney, Agent, or Firm* — Blakely, Sokoloff, Taylor & Zafman LLP

(57) ABSTRACT

In one embodiment, non-transitory computer-readable medium stores instructions for establishing a trusted two-way communications session for account creation for an online store, which include instructions for causing a processor to perform operations comprising retrieving and verifying a signed configuration file from a server, requesting a communication session using the configuration file, receiving a payload of account creation forms from a network client, signing the payload according to the server configuration file, and sending the signed payload containing account creation information to the server. In one embodiment, a computer-implemented method comprises analyzing timestamps for requests for data forms for supplying account creation information for evidence of automated account creation activity and rejecting the request for the locator of the second account creation form if evidence of automated account creation activity is detected. Methods for secure account authentication and asset purchase are also disclosed.

28 Claims, 16 Drawing Sheets

(56) References Cited

U.S. PATENT DOCUMENTS

| | | |
|---|---|---|
| 7,302,578 B2 * | 11/2007 | Kobayashi .................... 713/182 |
| 7,343,351 B1 * | 3/2008 | Bishop et al. .................. 705/67 |
| 7,356,711 B1 * | 4/2008 | Calinov et al. ................ 713/180 |
| 8,185,942 B2 | 5/2012 | Farrugia et al. |
| 2008/0307515 A1 | 12/2008 | Drokov et al. |
| 2009/0144540 A1 | 6/2009 | Davis et al. |
| 2011/0010759 A1 | 1/2011 | Adler |

\* cited by examiner

Secure Account Creation: Sending Account Creation Information - 420

Fig. 6    Secure Account Creation: Server - 600

Secure Purchase: Device - 1200

SECURE ACCOUNT CREATION

CROSS-REFERENCE

The present application claims the benefit of provisional application Ser. No. 61/703,736 filed Sep. 20, 2012, which is hereby incorporated herein by reference.

BACKGROUND OF THE DISCLOSURE

Online application stores and media stores are exposed to multiple security risks that must be managed to ensure that user data, developer content, and artistic media is kept secure. Even if secure communications protocols are used between an online store and electronic devices utilizing the online store, vulnerabilities can still exist if certain elements of the security system are disabled or rendered insecure due to either unintentional or intentional action by the user, or some device or system malfunction. In some scenarios it is possible that users can be coerced into intentionally compromising system security in a manner that renders an otherwise trusted network system insecure. Additionally, automated exploits used to rapidly create and configure a large number of online application store accounts can place the application and media stores, as well as legitimate users, in significant risk of fraudulent activity.

SUMMARY OF THE DESCRIPTION

In one embodiment, a non-transitory computer-readable medium stores instructions for establishing a trusted two-way communication session for account creation for an online store, which include instructions for causing a processor to perform operations comprising retrieving and verifying a signed configuration file from a server, requesting a communication session using the configuration file, receiving a payload of account creation forms from a network client, signing the payload according to the server configuration file, and sending the signed payload containing account creation information to the server.

In one embodiment, a non-transitory computer-readable medium stores instructions for causing a processor to perform operations comprising gathering information for creating an account for an online store including presenting, in a first application on a device, one or more account creation forms with user-fillable data to a user for data input, bundling the one or more forms into a message payload, and sending the message payload to a second application on the device to be signed.

In one embodiment, a computer-implemented method comprises recording a timestamp of a request for a locator of a first account creation form, recording a timestamp of a request for a locator of a second account creation form, analyzing the timestamps for evidence of automated account creation activity, and rejecting the request for the locator of the second account creation form if evidence of automated account creation activity is detected.

In one embodiment, a computer implemented method at an electronic device comprises retrieving and verifying a signed configuration file from a server, requesting a communication session using the configuration file, requesting authentication information from a user, signing a message containing the authentication information according to the configuration file, and sending the message to the server.

In one embodiment, a computer implemented method at an electronic device comprises creating a message with a purchase identifier and a vendor identifier associated with an item for purchase from an online store, signing the message according to a server security configuration file, and sending the message and an opaque server security token to an online store.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Various embodiments and aspects of secure account creation, authentication, and purchase will be described with reference to details discussed below; the accompanying drawings will illustrate the various embodiments. It is to be noted that the following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 1:
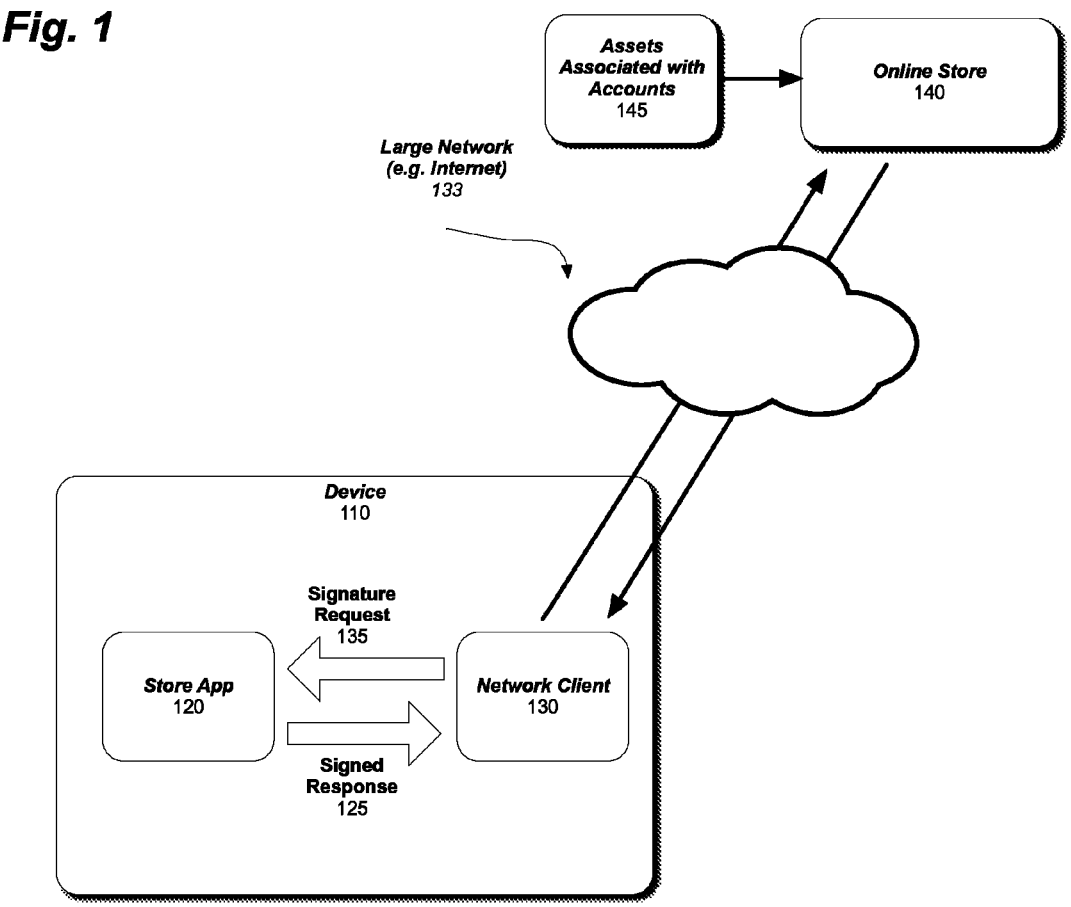
FIG. 1 is a block diagram of one embodiment of a mobile data processing system suitable for use with the described embodiments.

FIG. 1 is a block diagram of one embodiment of an online store model that allows applications or media to be purchased and downloaded to an electronic device over a network. In one embodiment, a device 110 executing a store application 120, such as the iTunes App Store, provided by Apple Inc. of Cupertino Calif., can use a network client framework 130 for rendering web pages, (e.g., the WebKit framework) to connect the store app 120 to an online store 140 over a large network (e.g. the Internet). The network client framework 130 can be a web browser framework for rendering web pages that provides the store app 120 access to data via Hypertext Transfer Protocol (HTTP), or some equivalent protocol. One element of security available to the device 110 when communicating over a network is a secure socket implementation (e.g. Secure Socket Layers, or Transport Layer Security) that allows data to be encrypted during transport over the network. However, various exploits and workarounds to secure socket layers are available to malicious users, so additional security layers are desirable. Additionally, while Secure Socket Layers (SSL) and Transport Layer Security (TLS) can provide assurances that a device can properly authenticate, it does not provide assurances that the device is a known and user operated device, as opposed to a device using a script to perform automated operations. Accordingly, it is desirable to provide additional security methods, such as enhanced server side heuristics, to the online store 140 that can detect and repel automated attacks on the account creation, account authentication and store purchase actions that the online store 140 makes available for devices, while minimizing negative side effects to the user experience of legitimate users.

In one embodiment, transactions between a device 110 and an online store 140 are made more secure by a combination of a shared secret opaque token passing system, cryptographically signed messages, and anti-automation heuristics. In one embodiment, the device 110 can interact with an online store 140 using a Hypertext Transfer Protocol that is known in the art, while signing messages with cryptographic keys to attest to the device authenticity. The device 110 can embed opaque tokens in a message or message header that contain server security state information that enables an online store 140 to verify the authenticity of the message signature. In one embodiment, message signatures associated with messages from the online store 140 allow the device 110 to trust the authenticity of the online store. Server security state information maintained via an opaque token can allow the device to authenticate with multiple servers without requiring the device to, for example, establish and maintain a session with each server separately. To protect the security of the token system, the web browser framework (e.g. network client 130) does not have specific knowledge of the nature of the token system, but instead can request that the store app 120 manages the creation and use of the security system. For example, in one embodiment, the web browser framework (e.g. network client 130) can submit a message to the store app 120 with a signature request 135 to sign the message or message payload, and the store app 120 can return a signed response 125 to the web browser framework, which includes the original message, and a cryptographic signature attached to or embedded within the message. The browser framework can then pass the signed message and opaque token over a large network 133 to the online store 140, which can load a security state from the token and use various methods to validate the signature attached to, or associated with the message. In one embodiment, the signing request from the web browser framework can be triggered by software embedded in the webpage of an online store.

In one embodiment, transactions between a device 110 and an online store 140 are made more secure by a combination of a shared secret opaque token passing system, cryptographically signed messages, and anti-automation heuristics. In one embodiment, the device 110 can interact with an online store 140 using a Hypertext Transfer Protocol that is known authenticity. The device 110 can embed opaque tokens in a message or message header that in the art, while signing messages with cryptographic keys to attest to the device contain server security state information that enables an online store 140 to verify the authenticity of the message signature. In one embodiment, message signatures associated with messages from the online store 140 allow the device 110 to trust the authenticity of the online store. Sever security state information maintained via an opaque token can allow the device to authenticate with multiple servers without requiring the device to, for example, establish and maintain a session with each server separately. To protect the security of the token system, the web browser framework (e.g. network client 130) does not have specific knowledge of the nature of the token system, but instead can request that the store app 120 manages the creation and use of the security system. For example, in one embodiment, the web browser framework (e.g. network client 130) can submit a message to the store app 120 with a signature request 135 to sign the message or message payload, and the store app 120 can return a signed response 125 to the web browser framework, which includes the original message, and a cryptographic signature attached to or embedded within the message. The browser framework can then pass the signed message and opaque token over a large network 133 to the online store 140, which can load a security state from the token and use various methods to validate the signature attached to, or associated with the message. In one embodiment, the signing request from the web browser framework can be triggered by software embedded in the webpage of an online store.

To make use of an online store, a device and associated user may need an account to authenticate the user with the device, and to authenticate the device with the online store. If financial data is associated with the online store account, such data can become the target of fraud or theft, and will require a secure account management system to protect the account from malicious actors, and to prevent malicious actors from using fraudulent means to create a large number of accounts using illegitimate or stolen information. Malicious actors can then provision the newly created accounts with fraudulently obtained financial information and make a large number of purchases before being detected and the fraudulent accounts are disabled.

Additionally, in one embodiment, numerous assets 145 associated with accounts are stored online in a cloud storage system (e.g. iCloud), or some other account based distributed network storage system, and can be made available to multiple devices associated with a single account. For example, some assets can be backed up to a cloud storage system from an electronic device, and then restored to the electronic device after a device reset or firmware upgrade. In one embodiment, assets associated with an account can be uploaded to a cloud storage system from one device, and then accessed on demand from any device associated with uploading account. Accordingly, it would be beneficial for security measures associated with online store account creation, authentication, and asset purchase to contain multiple layers of security to prevent malicious actors using fraudulent means from exploiting account authentication or online store purchase systems, and potentially gaining illegitimate access to online store accounts, or assets associated with an account. Additionally, security measures using methods of detecting automated account creation can be used to limit mass fraud and theft associated with the rapid creation of online store accounts via automated means.

Figure 2:
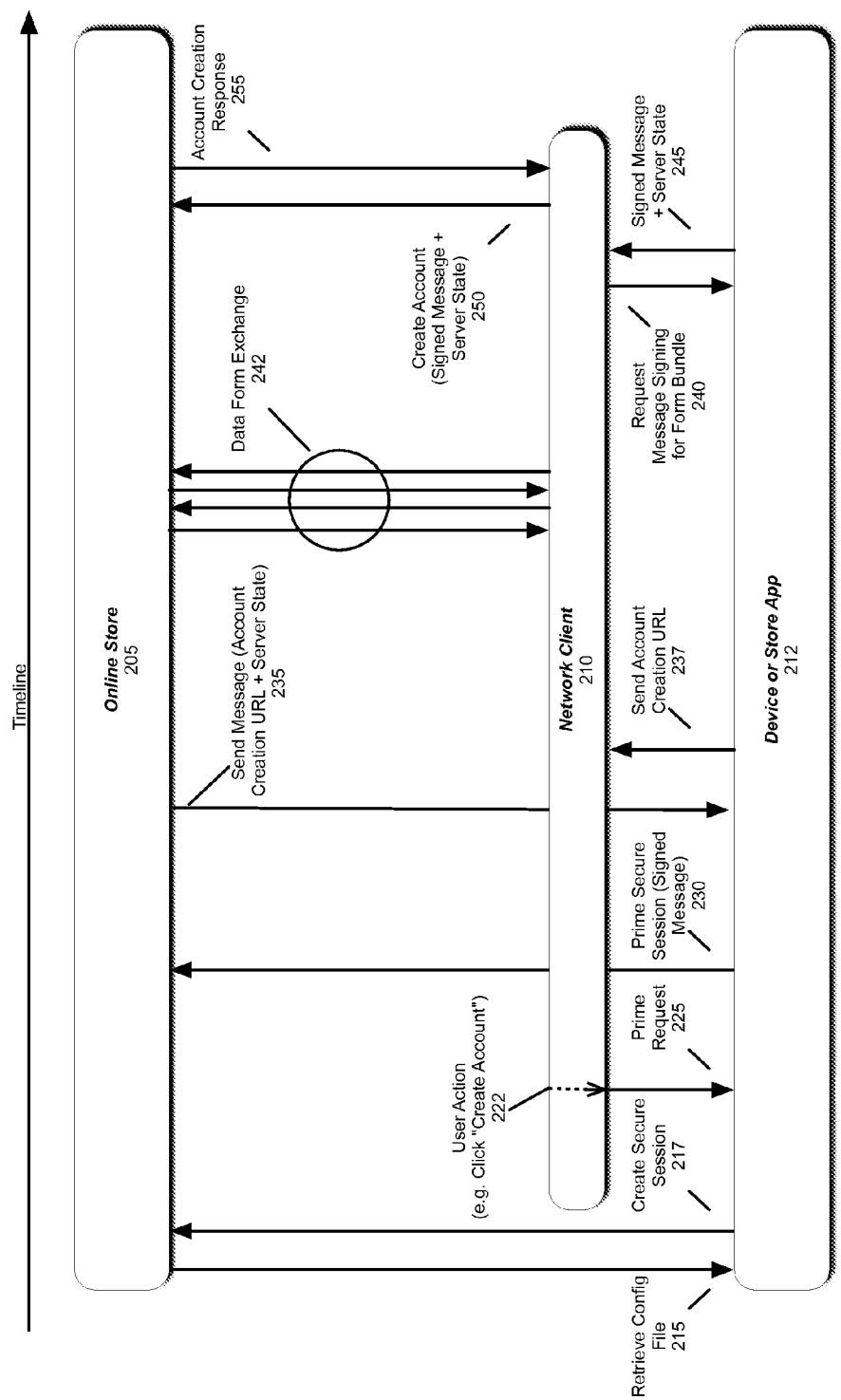
FIG. 2 is a diagram illustrating an example data flow timeline between multiple elements of a secure account creation system.

FIG. 2 is a diagram illustrating an example data flow timeline between multiple elements of a secure account creation system 200, which can protect the integrity of user account information during the account creation process, and hamper automated account creation systems that are used to create numerous fraudulent accounts. In one embodiment, an online store 205, which can contain applications, books, music, movies, or other digital content for purchase and download over a network, only allows account creation from a specific subset of trusted devices, such as device 212, which can interact with the store using the secure account creation system 200. In one embodiment, a device 212 contains software or hardware that is capable of using the secure account creation system 200. In one embodiment, a device 212 executes an online store application having an identifier that identifies the application and allows the application to be authenticated by the online store.

In one embodiment, when the device or associated online store application 212 connects to the online store 205, it retrieves a configuration file 215 that can be used to configure the shared secret relationship between the device 212 and the online store 205. In one embodiment, the configuration file is cryptographically signed and versioned such that the device 212 can verify that the configuration file is authentic and current. The configuration file can define details such as which actions by the device should be cryptographically signed, and which certification key, among multiple available certification keys, can be used to sign messages associated with a given action. In one embodiment, the configuration file can also define details such as which actions by the server should be cryptographically verified, and which certification key, among multiple available certification keys, can be used to verify messages associated with a given action. In one embodiment, the configuration file can be changed if one area of the system or another is compromised, which can invalidate exploits that assume a static security configuration. Additionally, multiple configuration files can be used for multiple regions, such that an exploit mechanism uncovered in one region cannot be used in another region with a different shared secret security configuration.

In one embodiment, having acquired the current configuration file, the device 212 can use data in the configuration file to create a secure session 217. A subsequent user action 222, such as the user clicking a "Create Account" button presented via a user interface provided by a network client framework 210, presented by a store application (e.g. store application 120 of FIG. 1) executing on the device 212. In one embodiment, the account creation flow can only begin via a user-triggered event, such a user action 212 and cannot be triggered programmatically. Such user action 212 can trigger a session prime request 225 by the network client framework 210 to the device or app store 212 to prime a secure session, which can be used to create an account on the online store 205. In one embodiment, the device, or app store executing on the device 212 consults the configuration file to determine if the account creation action is an action that is to be protected when communicating with the online store 205. If such action is a protected action, the configuration file will inform the device of the method to use to protect messages associated with that action. In one embodiment, at least four certification keys are available to choose from, including a server integrity key, a server encryption key, a client integrity key, and a client encryption key. The configuration file can contain a list of one or more actions, and then indicate which key to use when signing messages for a particular action, and which key to use when verifying received messages during a particular action. In one embodiment, deviation from the configuration specified in the configuration file can result in a message being ignored or disregarded as invalid, or can result in the termination of the session if an exploitation attempt is detected.

In one embodiment, the device or store app 212 can response to a prime request 225 from a network client 210 by generating a prime secure session message 230, and consulting the configuration file settings to determine the manner in which to protect the outgoing message. The prime secure session message 230 can be verified by the online store 205 and, if proper, the online store will begin the secure account creation session and send a message 235 containing the first account creation form Uniform Resource Locator (URL) and a server state token. In one embodiment, the device 212 can verify the message 235 containing the account creation URL and server state token in the manner prescribed by the configuration file, and if the message is valid, sends the account creation URL to the network client 210.

In one embodiment, in each message, an opaque token, which comprises data such as the server security state, is passed between a server, such as the online store 205, and the client, such as the device 212, when exchanging messages. The token is opaque to the device, which means that the device may not have knowledge of precisely what data is contained in the token, or how the data is configured within the token. However the online store 205 can use the token to initialize the security state information used to verify and protect messages sent over the network. In one embodiment, the opaque token is a method used to implement a stateful message security system across a stateless communications protocol, and allows a two-way trust relationship to be established between any device and any server that is privy to the shared secret system, without having to store and transmit server state information. For additional information on one embodiment of an opaque token-based security system, see U.S. Pat. No. 8,185,942 entitled "Client-server opaque token passing apparatus and method," which is incorporated herein by reference.

In one embodiment, the device 212, having validated the return message 235 sent from the online store 205 in response to the session prime message 230, can send the account creation URL 237 to the network client 210 to start the account creation processes. In such embodiment, secure account creation system 200 can refuse to acknowledge the account creation process flow unless it has established a secure session with the device 212, and the device begins the account creation process at the location specified in the message 235 containing the account creation URL. The network client 210, having the proper account creation URL, can retrieve a first account creation form from a web server, which can be the online store, or some other server dedicated to providing Hypertext Transfer Protocol (HTTP) services. In one embodiment, the online store provides secure message protection and validation, while some other server provides the web forms. The server providing the web forms need not have knowledge of the opaque server state tokens, which, in one embodiment, can be transported along with the secured messages using the HTTP header of the message. For example, in one embodiment, a specific, special purpose header value can be used to indicate to the online store that the message is protected, and thus may require decryption and/or verification before handling the message, or relaying the message to a different server for handling.

In one embodiment, an electronic data form exchange 242 takes place between the network client 210, which can be a web browser or a web browser framework, which provides a web based user interface to a store app, such as the store app 120 of FIG. 1. The electronic data form exchange 242 will be examined in further detail in FIG. 3 below. During this exchange, a user can provide personal information, including a name, user name, e-mail address, or password, along with optional financial information with which to make purchases. A user may also be asked to accept a certain number of terms and conditions that apply to the online store and the associated account. During this time, the Online Store, web server, or some other server can track the usage pattern and behavior of the network client as the one or more forms are filled. In one embodiment, if the one or more forms are filled very quickly, and in a manner that suggests automation (e.g. all form fields are filled within one second) the online store can take steps which can include refusing to server subsequent forms, terminating the secure session, or continuing the data form exchange 242 but rejecting the final account creation step, which can occur when the filled electronic forms are submitted for processing.

Having acquired information from the user via the electronic data forms, the network client 210 can submit the filled forms to the online store. In one embodiment, the network client 210 can send a message containing a bundle of the data forms as a message payload to the device 212 with a request to secure the message. If the server configuration file 215 indicates that the account creation form submission action is an action to be protected by the device 212, then the message and associated payload (e.g. the completed form bundle) can be protected in the manner indicated by the configuration file, and a signed message and server state token 245 can be returned to the network client 210, which can then send a create account message 250, which contains the signed message and payload, along with the server state for message verification or decode. In one embodiment, the device 212 can send the signed message and server state 245 directly to the online store, which can interpret that message as the "create account" message 250. The online store, having verified and processed the account creation message, can return an account creation response 255, which can indicate the successful completion or failure of the account creation process.

Figure 3:
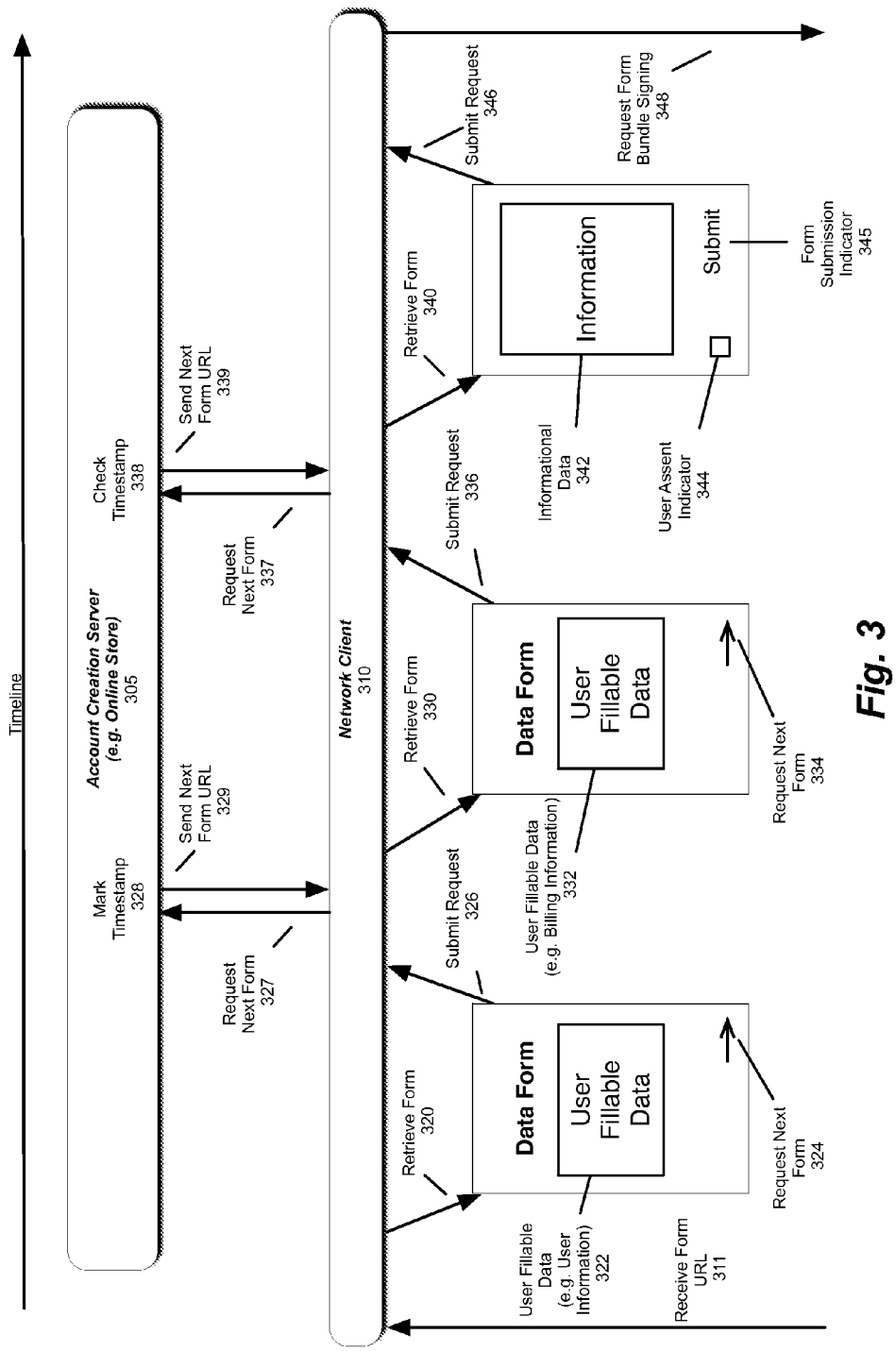
FIG. 3 is an illustration of one embodiment of an electronic data form exchange.

FIG. 3 is an illustration of one embodiment of an electronic data form exchange; such as the data form exchange 242 of FIG. 2. In one embodiment, a network client running on an electronic device, such as the electronic device 212 of FIG. 2, can receive a file locator, such as a Uniform Resource Locator or equivalent, for the first form 311 for account creation. The network client 310, can be a web browser, or a web browser framework used to provide a web interface for a store application, and can retrieve the first electronic data form for account creation from a web server, which can be a standard HTTP server as is known in the art, or a server such as the account creation server 305, which can be limited to signing, verification and secure session management, or can perform web server functions in addition to signing, verification and secure session management.

In one embodiment, the network client 310 can retrieve the first electronic data form 320 and present the form to a user. The form can be electronically filled with user data 322, such as user personal information including name, e-mail address, address, and other personal user information, which can be used to create an online store account. Upon completing the form, a user can perform a user action, such as clicking a next form indicator 324, which can be an arrow, button, icon, or some indicator that the user is ready for the next form. In one embodiment, the detection of user actions, such as a touch screen press, keyboard press or mouse click, can provide additional indication that a user performs the process, rather than a script or a program designed for repetitive and high speed account creation. When a user submits a request 326 to the network client 310 for the next form, the network client can, in one embodiment, send a message 327 to request the next electronic form from an account creation server 305. In one embodiment, the account creation server manages the timeline of the workflow of the account creation server process and keeps track of the amount of time between requesting an first electronic account creation form and requesting a second, or subsequent account creation form.

For example, in one embodiment, upon receiving a first request for the next account creation form (e.g. request for next form 327), the Account Creation Server can mark or record a timestamp 328 before sending the next form URL 329 to the network client. The network client can retrieve the form 330 using the URL from the account creation server, or some other server with web server functionality, and a user can enter user data 332, such as billing or financial information to pay for purchases through the online store (which can also be the account creation server 305). When a user completes this form, and performs a user action on the next form indicator 334, which can submit a request 336 to the network client, which can relay the request for the next form 337 to the account creation server 305.

In one embodiment, the account creation server can check the timestamp 338 of this request and compare the timestamp to an earlier marked or recorded timestamp, such as recorded timestamp 328. If, for example, two timestamps indicates a very short duration of time between receiving a first form and requesting a second form, or if the form cadence appears exact and precise, it can indicate the account creation process is being script driven instead of user driven. It is beneficial to disallow script driven, or automated online store account creation because creating a large number of online store accounts is one method by which perpetrators of electronic data theft or fraud may perform various malicious or illegitimate operations. For example, a large number of online store accounts can be created by a script, which rapidly and repeatedly emulates the user actions performed during online account creation, and then the same, or a different script can then provision those newly created only store accounts with stolen, false, or otherwise illegitimate billing or financial information, and then rapidly purchase a large amount of applications or media from the online store. Accordingly, in one embodiment the account creation server 305 can check timestamps, form request cadence, or other, similar methods to detect and prevent automatic account creation. In one embodiment, the entry fields in the form can record the rate of input and send the rate of input data to the account creation server 305 for detailed analysis along with the account creation data.

In one embodiment, after one or more successive requests for new account creation forms, if the account creation server 305 has not detected indicators of automated exploitation of the account creation process, the server can send the next form URL 338, which can be the final form URL, and the network client 310 can retrieve the electronic data form 340 from a web server or the equivalent. This form can contain informational data 342 for the user, such as terms and conditions, end user license agreements, or some other information for the user to read. If the informational data 342 is acceptable to the user, a user assent indicator 344 and a form submission indicator 345 can be pressed, clicked, or otherwise manipulated by a user, which can submit a request 346 for form submission and account creation.

In one embodiment, the network client 310 does not have knowledge of the processes and methods used to protect or verify messages, and can bundle the account creation forms, along with the data indicating user assent to the informational data, and any user behavioral information the network client 310 can be tasked to collect, and submit a request to sign a message 348 containing the bundle of forms and user data as a message payload. In one embodiment the request is submitted to a device, such as device 212 of FIG. 2, which then substantially performs the operations illustrated in FIG. 2, such as signing the message if indicated by the server configuration file, and sending the signed message and server state.

Figure 4A:
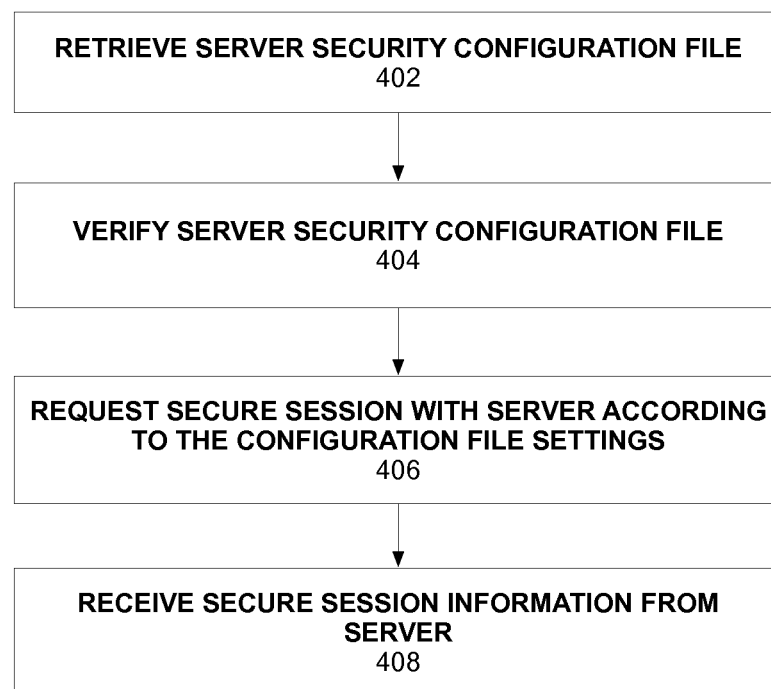
FIG. 4A-4C are flow diagrams of one embodiment of a secure account creation session involving operations by an electronic device.
Figure 4B:
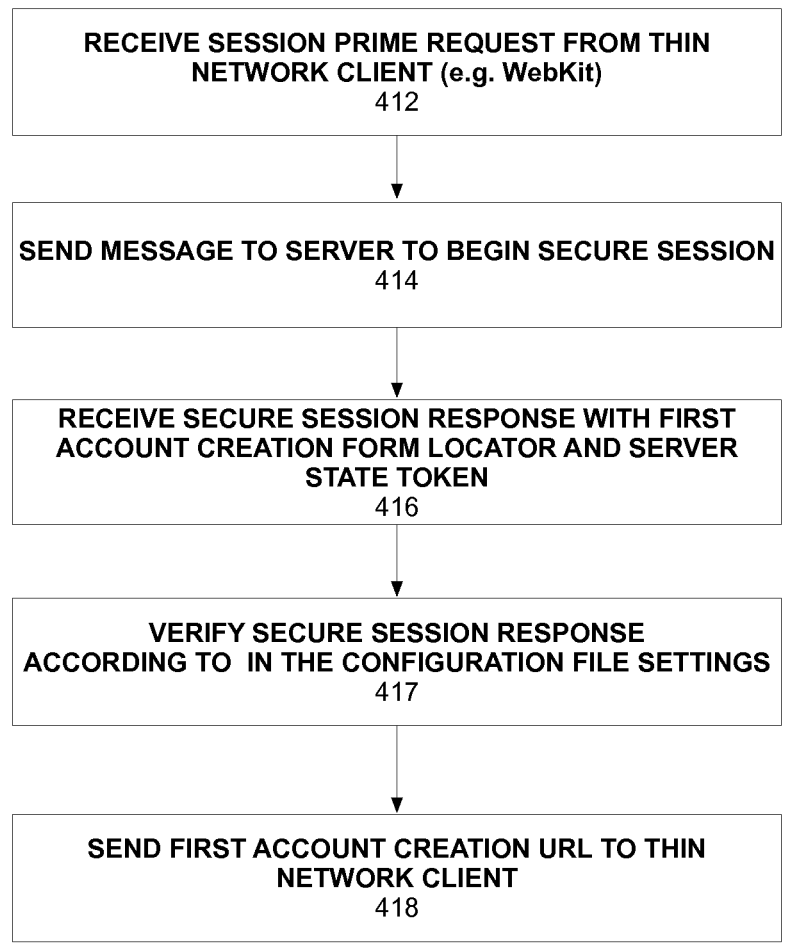
Figure 4C:
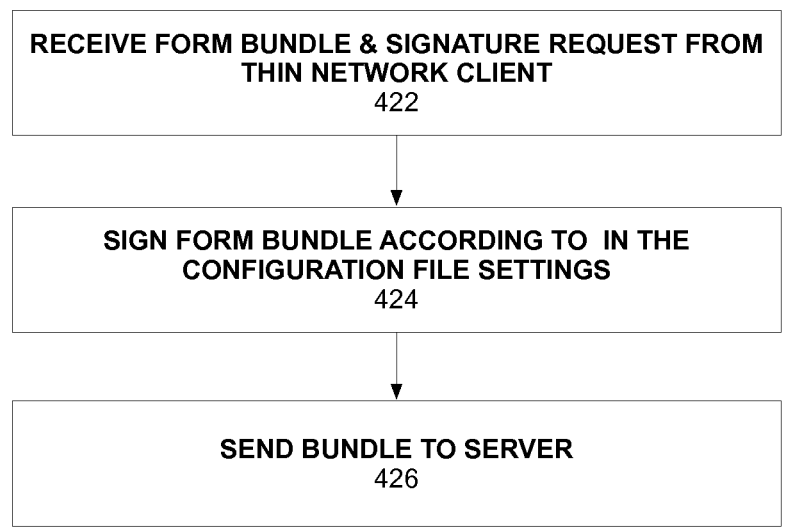

The actions and operations of each component of the account creation process will be examined individually below. FIGS. 4A-4C are flow diagrams of one embodiment of a secure account creation session involving operations by an electronic device, in which FIG. 4A illustrates a flow diagram of one aspect of one embodiment of secure account creation at an electronic device involving operations 400 to create a secure session; FIG. 4B illustrates a flow diagram of one aspect of one embodiment of secure account creation involving operations 410 to begin a secure session; and FIG. 4C illustrates a flow diagram of one aspect of one embodiment of secure account creation involving operations 420 to send account creation information to a server. In one embodiment, the electronic device is similar or equivalent to the device 110 of FIG. 1 or the device 212 of FIG. 2.

In FIG. 4A, the electronic device and the server, which can be a dedicated account creation server, or can be a server used to house a portion of the online store, or can be a dedicated secure session manager, can seek to establish a trust relationship. In one embodiment, the device can perform operation 402 to retrieve the server security configuration file when connecting to the online store. The device can also perform an operation 404 to verify the server security configuration file, which includes checking the file version, to ensure the proper version has been retrieved, and verifying the signature of the server configuration file, to ensure it is an authentic file. In some circumstances, the device may not immediately perform an action that involves the protection or verification of messages, but can still perform an operation 406 to request a secure session with the server. In one embodiment, the device can reference the configuration settings in the configuration file to attain the details used to negotiate and establish a session with the server before the device has to perform any actions using the secure session, as one method of reducing delay when a first protected action is performed. If the foregoing operations between the server and the device were proper, and in accordance with the correct server configuration settings, in operation 408 the device can receive information from the server to use when beginning a protected transaction.

In FIG. 4B, the electronic device, or a dedicated application on the device with knowledge of the secure session interface, can act as a proxy for a network client to send protected messages. The network client can be a web framework which is configured to render web pages, and which may not have any knowledge of the workings of secure session interface, but can send messages using the secure session interface utilizing the device as a relay. In one embodiment, only a device with knowledge of the secure session interface, or an application running on a device with knowledge of the secure session interface, can be used to create an online store account, and attempts to create an account without using the secure session interface can be rejected or disregarded. In the case of secure account creation, methods can be employed to ensure a user, and not a script, is conducting the account creation. In one embodiment, only a user action, such as clicking on a "create account" button presented to the user via a web browser, or the network client framework used by an online store application on a device can begin the account creation process. At that point, the device, or online store application executing on the device, can perform one embodiment of method 410, to begin a secure session, which begins when the device receives a request 412 to prime, or make ready for action, a secure session between the device and the server for use by the network client for account creation, which can have been previously established via an embodiment of a method such method 400 of creating a secure session described in FIG. 4A.

In one embodiment a secure session can be both time limited and device specific, such that the session can expire after a period of time, and messages that are intercepted in transit will fail message verification if replayed by a different device. In one embodiment, the time-limited session can begin when operation 414 is performed, which sends a message to a server to begin a secure account session on behalf of the network client. The configuration file retrieved by the device before establishing a session can contain a list of actions to protect when sending to a server, and if the begin account creation session action is listed, then the device will protect the message in the manner prescribed. The server can verify if the message is properly protected, and then authenticate that protection. For example, if the current server configuration calls for a message to be signed with a certain key (e.g. a device integrity key) then the server first checks to see if the message is signed, and if the message is signed, if it is signed with the proper key. A non-conformant message may be coming from an illegitimate device, or, if the signature does not match the message, the message could have been a legitimate message that was intercepted and modified, or otherwise replayed. If the message is properly verified, the device can then receive a secure session response, which can include the first account creation form locator (e.g. a URL to the account creation form) and an abstract server state token to use for the next communication with the server.

In one embodiment, server configuration file lists both actions to protect, and actions to verify, and the secure session response from the server can be listed as an action to verify. In such a case, the device will authenticate the signature of the message from the server in operation 417 to determine if the message is authentic. If the message is properly signed, the device can trust the message's contents, and, in operation 418, can send the included account creation URL to a network client for display and data entry by a user. The network client can proceed to gather one or more forms containing user information for account creation, and bundle those forms in a message, which can be sent to the device for protection.

FIG. 4C is a flow diagram illustrating one embodiment of a method 420 of sending account creation information to an account creation server in behalf of a network client. In one embodiment, having received the user information used to create an online store user account, the device, or online store application executing on a device, can perform operation 422, which receives a message containing a bundle, archive, concatenation or some other payload containing data from the electronic forms used for account creation. In operating 424, the form bundle is protected in the manner prescribed in the configuration file for submitting account creation data, and in operation 426 the bundle can be sent to the server. In one embodiment, the bundle can instead be sent to the network client, which can then relay the message to the server.

Figure 5:
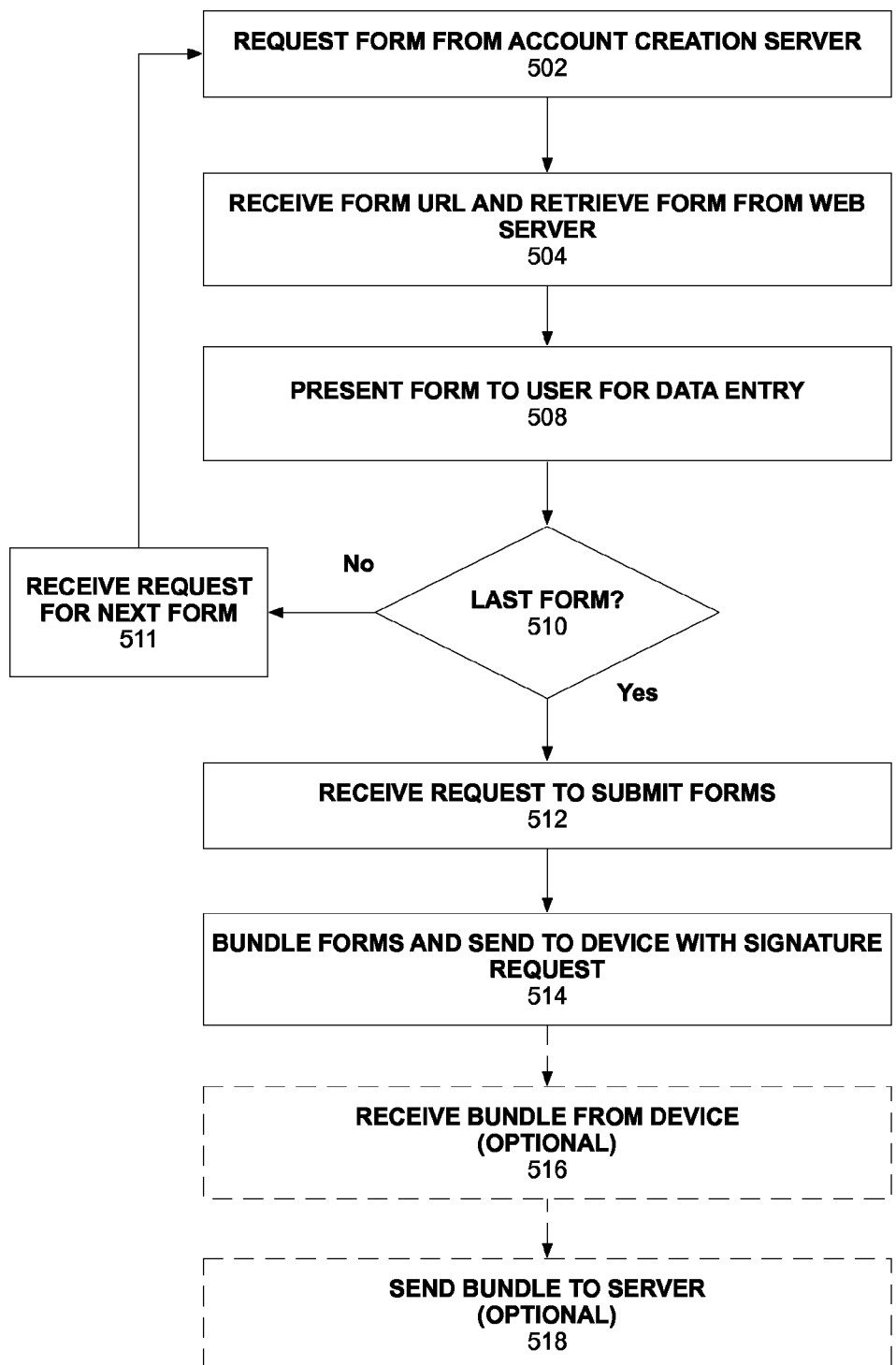
FIG. 5 is a flow diagram of one embodiment of a method of secure account creation from the perspective of a network client configured to render web pages.

FIG. 5 is a flow diagram of one embodiment of a method of secure account creation from the perspective of a network client, which is configured to render web pages. In one embodiment, the thin network client can execute on an electronic device as part of, or independently from, an online store application, to communicate with one or more network servers, which can include one or more online store servers. One embodiment of a method 500 of secure account creation at a network client can begin with an operation to request an electronic data form from an account creation server. This operation can also include the initial request to prime the secure session between the device and the online store. The initial prime request can be an explicit request to begin a secure session, or, if the network client is agnostic as to the secure session interface, can be a standard request for an electronic form over HTTP, which can be understood by a device as requiring the priming of a time limited secure session for account creation. In one embodiment, this request for an electronic data form is the result of a user action, such as clicking or pressing a "create account" button, which is an indicator that the proper account creation form should be requested from a server. In one embodiment, the location of the first account creation form need not be static, but can be determined on a per-device or a per-session basis.

In one embodiment, the network client, in operation 504, receives the first data form URL from the device, and retrieves the form from the web server, which can also be the online server, or some other HTTP server, and in operation 508 can present the data form to a user for data entry. Each time a data form is completed, based on the condition 510 of whether the current form is the last form, the network client can receive a request 511 for the next form, or can receive a request 512 to submit the completed forms for processing. In operation 514, the network client can bundle the forms and send a message containing the forms and a request to sign to sign, or otherwise protect the forms for submission to the server. The request to protect the message containing the form data can be an explicit message to the device or online store application, or an implicit request, where the device checks the configuration file and determines that the submission of account creation information is a protected action. In one embodiment, the signed or otherwise protected bundle is returned to the network client by the device, which receives the bundle in operation 516, and, in operation 518 sends the bundle to the server. Alternately, in one embodiment, the device or online store application executing on the device can send the message directly to the server.

Figure 6:
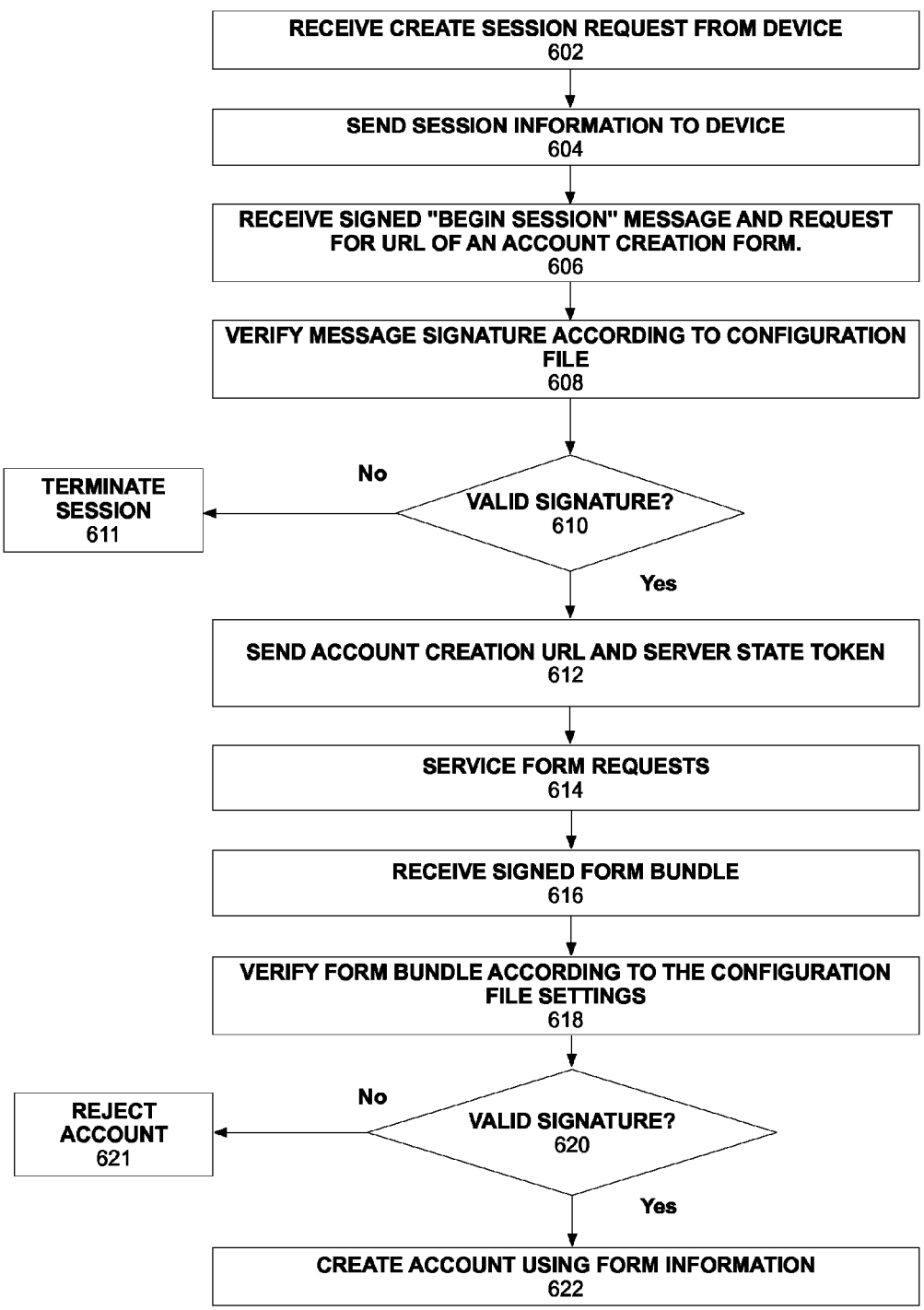
FIG. 6 is a flow diagram of one embodiment of a method of secure account creation from the perspective of an account creation server.

FIG. 6 is a flow diagram of one embodiment of a method of secure account creation from the perspective of an account creation server. In one embodiment, a method 610 of secure account creation begins when a device connects to an online store, which can also involve connecting to an account server, or an account creation server, all of which are on a network, and any of which can be part of, reside upon, or be independent from the online store. In operation 602, the server receives a create session request from a device, which wishes to establish a context for a two-way trusted communication method in which the device can trust communications from the server, and in which the server can trust communications from the device. In one embodiment, the manner of establishing a session can also be part of the shared secrecy relationship between trusted servers and trusted devices. If appropriate to do so under the security configuration of the server, an operation 604 can send session information to the device, which the device can use to subsequently begin to exchange protected and verified messages with the server.

In one embodiment, the server may subsequently, in an operation 606, receive a begin session message from a device. Operation 608 can verify the message signature according to the settings in the secure configuration file, such as the secure configuration file retrieved by the device in operation 402 in FIG. 4A. If, upon condition 610, it is determined that the signature is a valid signature, a response from the server can be sent in operation 612, which can include sending a message which includes an account creation URL, a server state token, and a signature for the message, if that message is listed as a message for the device to verify in the server state configuration. In one embodiment, the server may receive subsequent form requests for successive forms, which can be serviced in operation 614. Further detail on one embodiment of a method of detecting automated account creation is discussed in FIG. 7 below.

In one embodiment, the server can, in operation 616, receive a signed bundle of account creation forms containing data, which can be used to create a new account for an online store, and perform an operation 618 to verify the form bundle according to the configuration file settings specified for messages sent from a trusted device to a trusted server. If, upon conditional 620, the signature is proper, operation 622 can be used to create an account using the information in the bundle. If the signature is invalid, operation 621 can reject the account information, and an account will not be created using information in the bundled forms.

Figure 7:
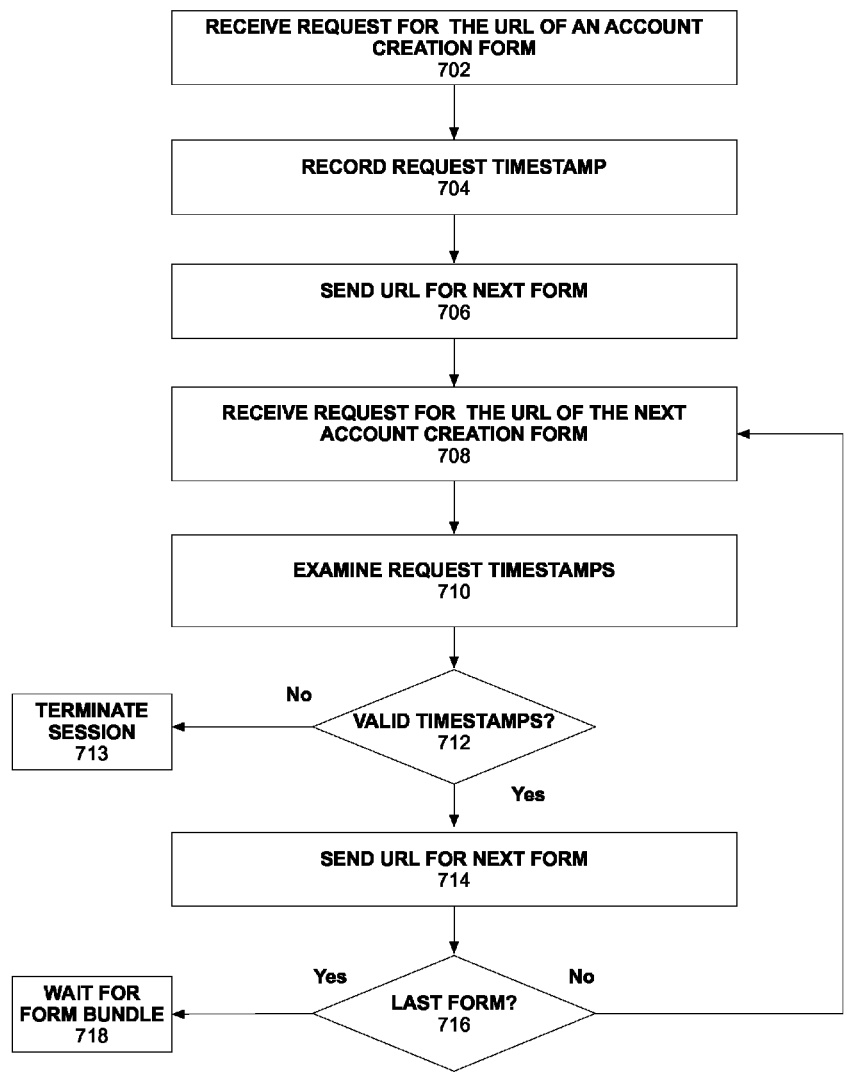
FIG. 7 is a flow diagram of one embodiment of a method of servicing form requests.

FIG. 7 is a flow diagram of one embodiment of a method 700 of servicing form requests, as discussed in operation 614 of FIG. 6. In one embodiment, a server, which can be the online store 205 of FIG. 2, or the account creation server 305 of FIG. 3, can receive a request message in operation 702 that includes a request for the URL of an account creation form. In one embodiment, the request occurs during a time limited and device specific communication session between the server and the device, and the server has knowledge of the device and which state of the account creation process the device is currently performing. The device can use this information in operation 704 to record, mark, or otherwise take notice of a timestamp associated with the request, before sending, in operation 706, the locator, URL, or equivalent resource information for the next form. In one embodiment, the form can be used by a web browser or web framework to collect information to create a new account for the online store.

In operation 708, a subsequent request for the URL of the next account creation form is received by the server, which can, in operation 710 examine the request timeout for various indicia of fraud, abuse, or automation on the part of the device, which has submitted the account information. For example, in one embodiment, rapid successive requests for account creation forms can indicate an automated account creation script is running on the device to create multiple accounts. The rapid creation of multiple accounts can indicate fraudulent activity is in progress, and the server can deny those requests. If, in operation 712 it is determined that the timestamp is invalid, the server may deny any subsequent form requests, or, in operation 713, terminate the current session with the device. One embodiment of a method of examining request timestamps is further discussed in FIG. 8 below.

In one embodiment, if the timestamps of the form requests do not suggest fraudulent activity is underway, operation 714 can send the URL for the next form to the device. If operation 716 determines the URL for the last account creation form has been sent, the server can perform operation 718, which waits until the final form is filled or acknowledged by the user, and the bundle of completed forms is submitted for processing. Until the last form is sent, the server can return to operation 708, which can receive subsequent requests for the location of account creation forms.

Figure 8:
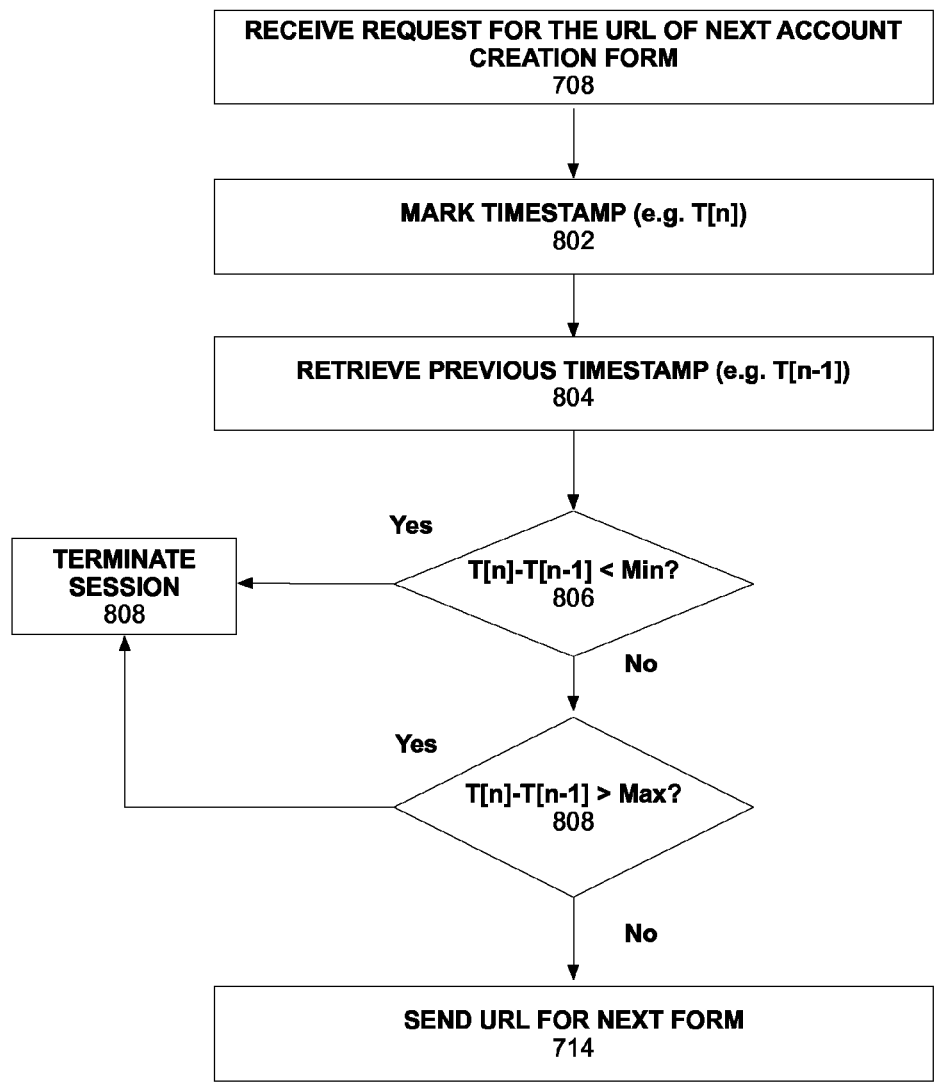
FIG. 8 is a flow diagram of one embodiment of a method of examining request timestamps on an account creation server.

FIG. 8 is a flow diagram of one embodiment of a method 800 of examining request timestamps on an account creation server, such as a method that can be employed during operation 710 discussed in FIG. 7. For example, if an operation such as operation 708 is performed where a server receives a request for the URL of the next account creation form to be processed, a server can perform operation 802 to mark, or otherwise record, a timestamp for the request. In one embodiment, where a previous request has been processed, example timestamps T[n] and T[n−1] are available, which represent the current and previous timestamp for an account creation form request. If, for example, in operation 806, it is determined that the difference between timestamps is below a minimum time, then the account creation process may be performed via the use of some form of scripting or automated process, and the server can take measures up to, and including operation 808, which terminates the session with the device. If, in operation 808, the time interval falls outside of some maximum time period, the session can time-out, which can also result in operation 808, which can terminate the session. It is to be noted that other analysis methods are possible; the example timestamp analysis techniques are presented for example purposes, and embodiments are not limited as such. For example, in one embodiment, the entry fields in the account creation form can record the rate of input of data into the forms, and send the rate of input data to the account creation server for detailed analysis along with the form data. Regardless of the analysis techniques employed, if the sequence of requests is proper, an operation, such as operation 714, can occur to send the a URL to locate the next account creation form to be sent to, for example, a network client framework on a device.

Figure 9:
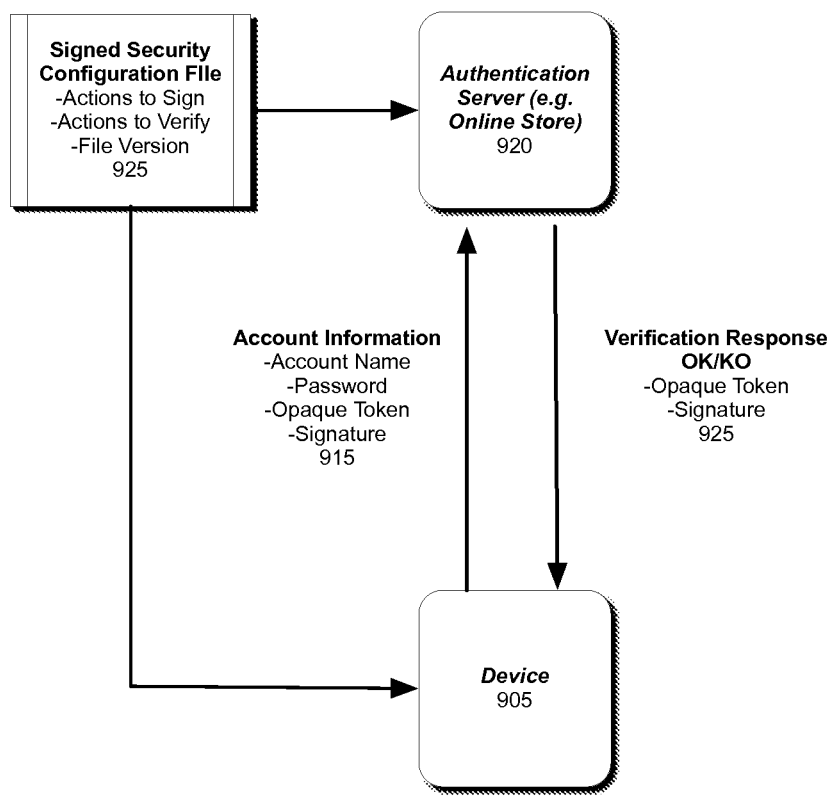
FIG. 9 is a block diagram illustrating one embodiment of secure account authentication.

FIG. 9 is a block diagram illustrating one embodiment of secure account authentication. Once an account has been created, subsequent attempts to use the account can be subject to various forms of account authentication. One form of secure authentication 900 can utilize a similar two-way shared secret trust relationship as is used during account creation to help ensure the device and the server used in the process are authentic. For example, a device 905 that is to authenticate with an authentication server 920 to make use of an online store account, can first retrieve a signed security configuration file 925 that contains information such as which actions performed by the device or the server should be protected or verified. The file can also contain a file version number, as the file can be changed at the discretion of the server's administrative authorities in response to some discovered exploit or security breach. In one embodiment, the authentication server 920 can be a server used for the online store, or can be some other server dedicated to account authentication.

In one embodiment, the device 905 can, in addition to performing a version check, can also authenticate, or otherwise verify a digital signature associated with the configuration file to verify the file's authenticity. If the file is proper, the device can seek to establish a trusted communication session with the server using a method similar to the method 400 of creating a secure session discussed in FIG. 4A. In one embodiment, the device can verify the server and establish a secure session immediately upon connecting to the online store, before account authentication is required, and can begin a non-time limited secure session with the online store. When an action that requires authentication is performed, an account information message 915 is sent. The message can contain an account name, account password, an opaque server state token for use during message verification, and a digital signature for the message, the signature having been generated according to settings specified in the server configuration file. The authentication server 920 can then verify the authentication message and send a verification response 925, which can be an affirmative message acknowledging the authentication (e.g. "OK") or a negative message indicating the authentication message was rejected. In one embodiment, if the opaque token containing the server security state is missing, or if the message is improperly signed, the authentication server can discard the message without attempting to verify the account information, and can decline to send a response to the device. In one embodiment, if the message verification fails the secure message verification process, a verification response 925 containing a knockout message (e.g. "K.O.") can terminate the session with the device.

Figure 10:
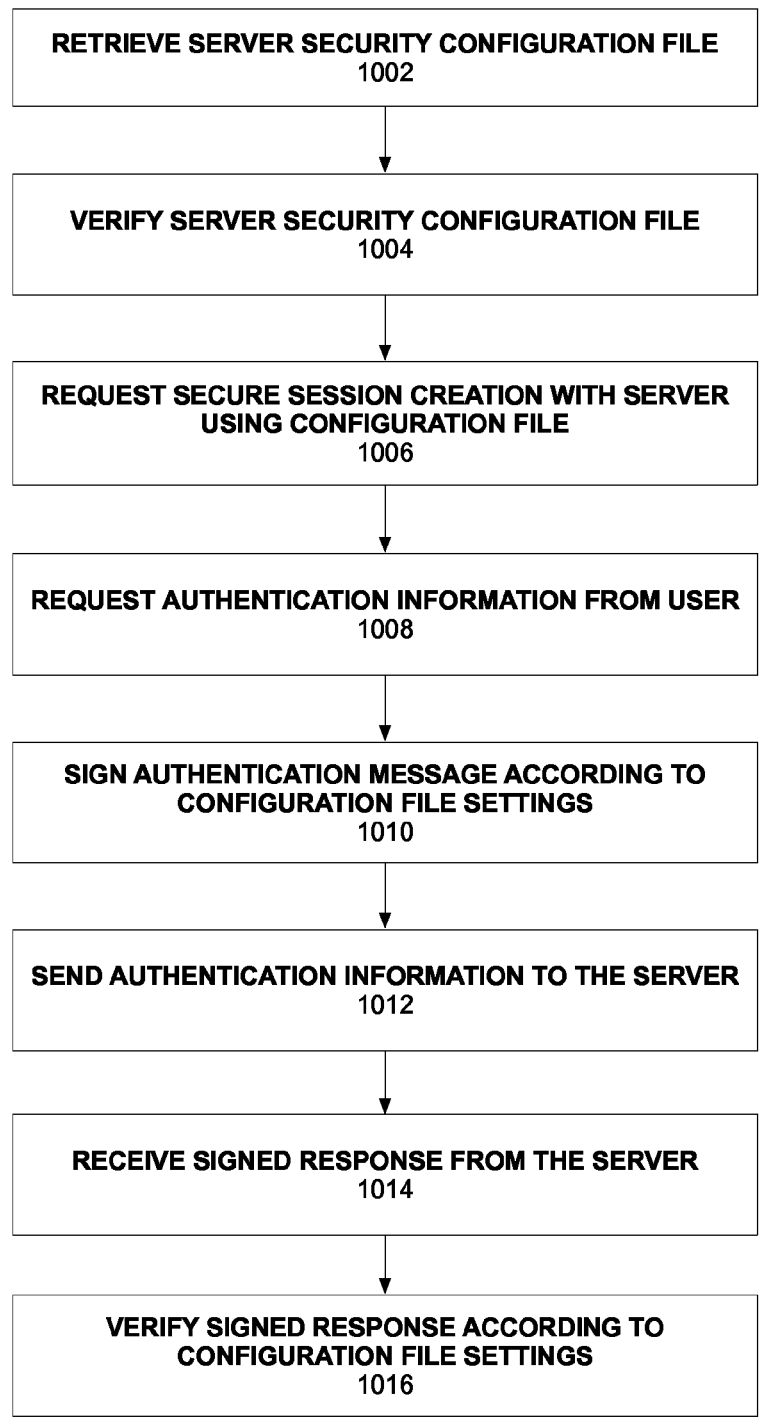
FIG. 10 is a flow diagram illustrating one embodiment of a method of secure authentication.

FIG. 10 is a flow diagram illustrating one embodiment of a method 1000 of secure authentication, which may be used by a device to authenticate an online store account. In one embodiment, a device can, in operation 1002, retrieve the server configuration file, and perform an operation 1004 to verify the server security configuration file. In one embodiment, these operations are delayed until account authentication is required. In one embodiment, these operations are performed immediately upon connecting to the online store. The device can, at some point prior to authentication, perform an operation 1006 to request the creation a secure session with the server, which, in one embodiment, can be the online store. When an account is to be authorized, operation 1008 can request authentication information from the user, a portion of which, such as the user account name, can be stored by the device, while a portion of which, such as the account password, can be requested each time authentication is to be performed. The authentication information can be included in a message, which can be signed according to methods prescribed in the server configuration file settings in operation 1010, and then sent to the server in operation 1012.

The device, in operation 1014, can receive a response to the authentication attempt from the server. In one embodiment, a digital signature attests to the authenticity of the response from the server; the device, in operation 1016 can verify the response according to the configuration file settings to ensure the message authenticity.

Figure 11:
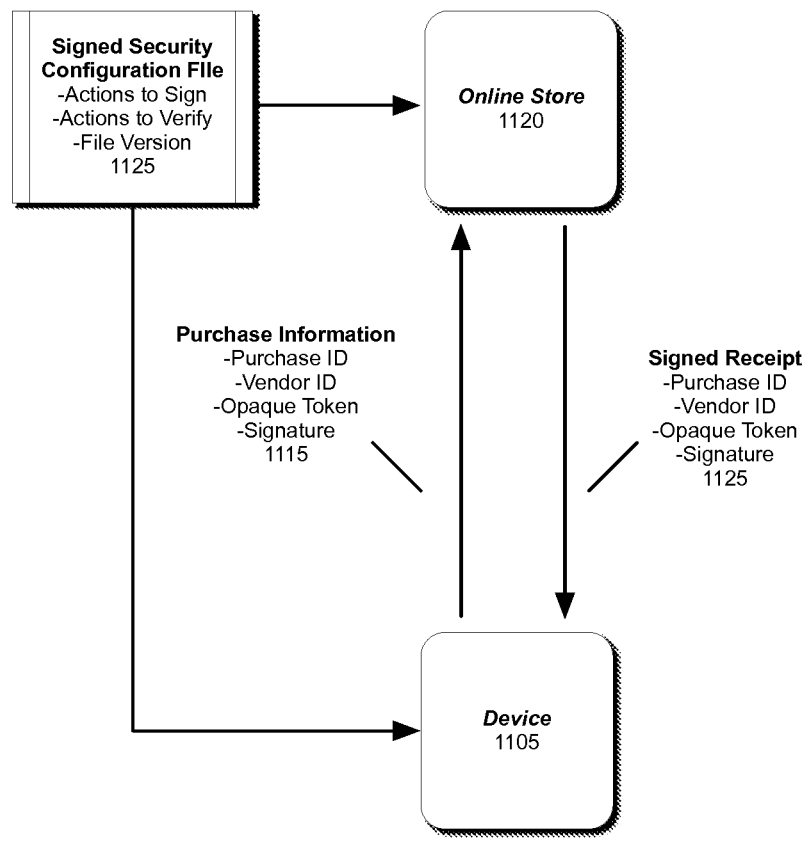
FIG. 11 is a block diagram illustrating one embodiment of secure asset purchase from an online store.

FIG. 11 is a block diagram illustrating one embodiment of a method 1100 of secure purchase, which can be used by a device to purchase assets from an online store in a secure manner. Operations by a device 1105 can be performed in a manner similar to the operations during secure account authentication 900 discussed in FIG. 9. In one embodiment, upon connection to the online store 1120, the signed security configuration file 1125 is retrieved and a secure session is established. In one embodiment, a secure session is created during account authentication, and is still present for use during asset purchase, though a session can be established if one is not present. Purchase information 1115, which can contain information such as a purchase identification number, a vendor identification number, an opaque token containing the server security state, and a digital signature, if the configuration file has indicated that online store purchases are to be protected actions. If the purchase is proper, a signed receipt is returned by the online store to the device, which can verify the signature of the receipt to ensure that the signature is from an authentic online store.

Figure 12:
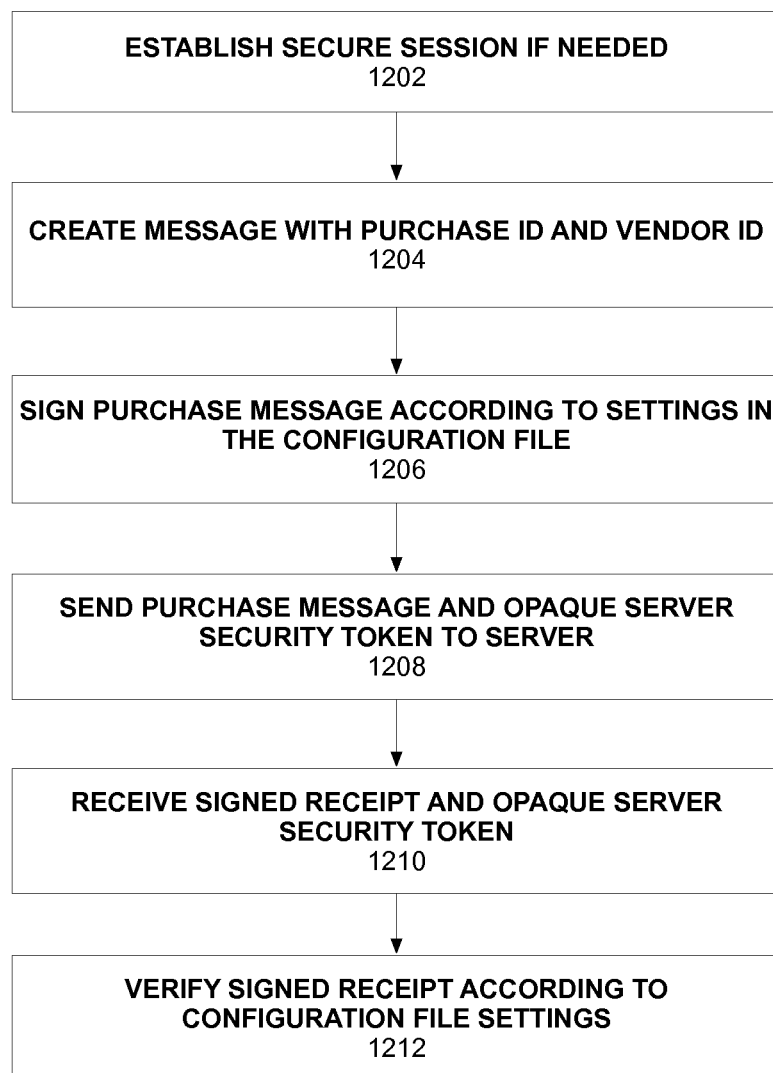
FIG. 12 is a flow diagram illustrating one embodiment of a method of secure asset purchase from an online store.

FIG. 12 is a flow diagram illustrating one embodiment of a method 1200 of secure purchase, which can be used by a device to ensure purchases are made and received from an authentic online store. In one embodiment, a device can perform operation 1202 to establish a secure session using methods discussed above if a session is not currently active for purchase, which can also include performing one embodiment of a method of secure account authentication, such as the method 1000 discussed in FIG. 10, if the online store account has not yet been authenticated. Subsequently, a device can, in operation 1204, create a message containing the purchase identification information and vendor identification information associated with the asset to purchase from the online store and, in operation 1206, sign the purchase message according to settings in the configuration file. When a secure session with the online store is established, an opaque server state token may have been provided to the device for transmission with subsequent messages associated with that session. Accordingly, in operation 1208, the signed message containing the purchase information, along with the secure server state token, is sent to the online store. In one embodiment, in operation 1210, if the purchase message was proper, a signed receipt is received from the online store, along with the opaque server security token, which can contain updated state information for the server. The device can, in operation 1212, verify the signed receipt according to the settings for message verification in the configuration file. In one embodiment, in-app purchases made within an application can be protected using the operations described, however the operations described above can also be supplemented by receipt verification actions performed by app developers to verify the contents of the receipt.

Figure 13:
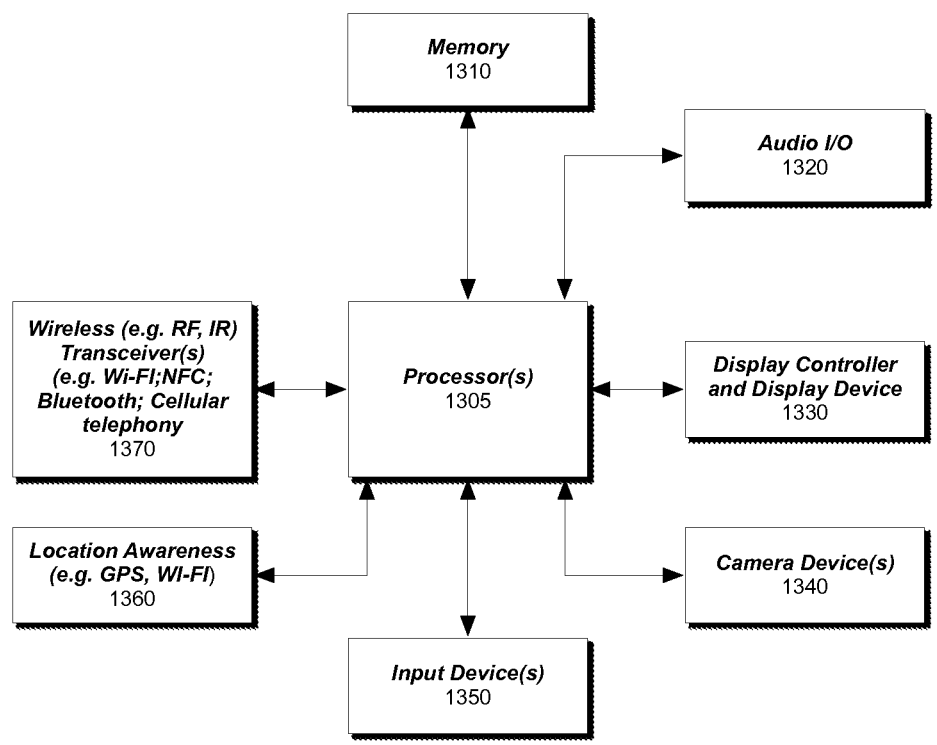
FIG. 13 is a block diagram illustrating one embodiment of a data processing system according to embodiments of the invention.

FIG. 13 is a block diagram illustrating one embodiment of a data processing system 1300 that can be used in an electronic device according to embodiments of the invention. In one embodiment, the data processing system of FIG. 13 may be a Macintosh computer, iPhone, iPad, or iPod Touch device, all from Apple Inc. of Cupertino, Calif. The data processing system 1300 can include a processing system 1305 with one or more microprocessors. The system 1300 can also include memory 1310 for storing data and programs for execution by the processing system. The system 1300 additionally includes an audio input/output subsystem 1320 that may include a microphone and a speaker for playing back music or providing telephone functionality through the speaker and microphone.

A display controller and display device 1330 can be used to provide a graphical user interface for the user, such as the graphics user interface provided by iOS devices such as, for example, the iPhone, iPad, and iPod touch. A wireless transceiver 1370 can transmit and receive data via one or more wireless technologies such as Wi-Fi, infrared, Bluetooth, or one or more variants of wireless cellular technology. One embodiment of system 1300 contains one or more camera devices 1340 configured in both a front and rear facing configuration, though similarly configured systems each with a front facing camera can be one of many optimal configurations. The data processing system 1300 can also include one or more input devices 1350 that allow a user to provide input to the system. Input devices can include a keypad or keyboard, alone or in conjunction with a touch or multi touch panel that is overlaid on the display device 1330. Additionally, embodiments of the data processing system 1300 can also include a device for providing location awareness services, such as a Global Positioning System (GPS) device 1360 or its equivalent.

It is to be noted that the data processing system 1300 as represented in FIG. 13 is by way of example. One or more buses or interfaces, which are not shown, can be used to interconnect the various components, as is well known in the art. As well, additional components, not shown, may also be part of the system 1300 in certain embodiments, and in certain embodiments fewer components than shown in FIG. 13 may also be used.

Figure 14:
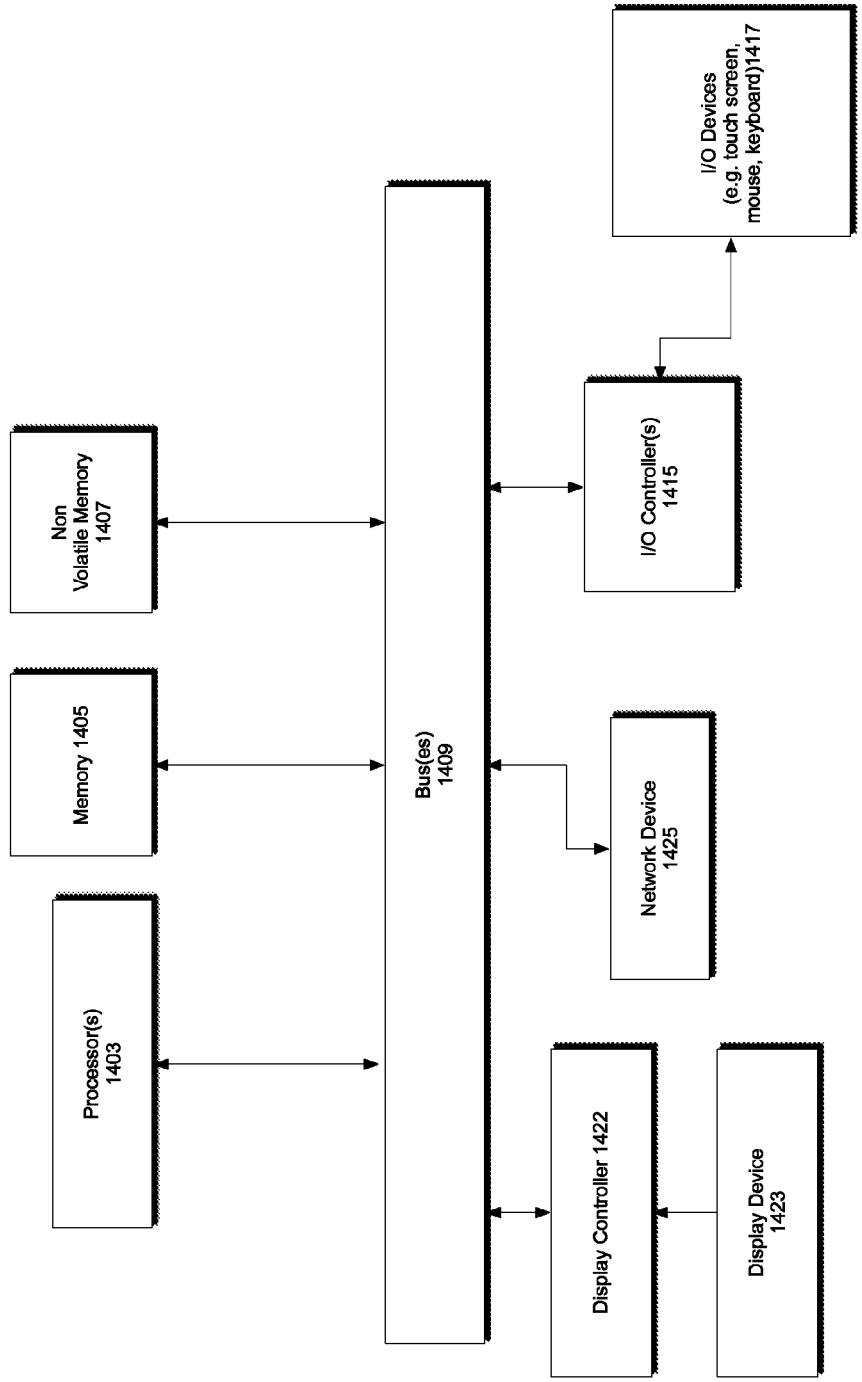
FIG. 14 is a block diagram illustrating one embodiment of a data processing system according to embodiments of the invention.

FIG. 14 is a block diagram illustrating one embodiment of a data processing system 1400 which can be used as an asset-purchasing device in conjunction with a store application, or can be used as an online store server according to embodiments of the invention. Note that while FIG. 14 illustrates the various components of a data processing system, such as a computer system, it is not intended to represent any particular architecture or manner of interconnecting the components as such details are not germane to the present invention. It will also be appreciated that other types of data processing systems, which have fewer components than shown or more components than shown in FIG. 14, may also be used with the present invention. As shown in FIG. 14, the data processing system 1400 includes one or more buses 1409, which serve to interconnect the various components of the system. One or more processors 1403, each containing one or more processor cores, are coupled to the one or more buses 1409 as is known in the art. Memory 1405 may be volatile Sequential DRAM, nonvolatile RAM or may be flash memory or other types of memory. This memory is coupled to the one or more buses 1409 using techniques known in the art.

The data processing system 1400 can also include nonvolatile memory 1407 which may be a hard disk drive or a flash memory or a magnetic optical drive or magnetic memory or an optical drive or other types of memory systems which maintain data after all power is removed from the system. The nonvolatile memory 1407 and the memory 1405 can both couple to the one or more buses 1409 using known interfaces and connection techniques. A display controller 1422 is coupled to the one or more buses 1409 in order to receive display data to be displayed on a display device 1423 which can display any one of the user interface features or embodiments described herein. The display device 1423 can include an integrated touch input to provide a touch screen. The data processing system 1400 can also include one or more input/output (I/O) controllers 1415 which provide interfaces for one or more I/O devices such as one or more mice, touch screens, touch pads, joysticks, and other input devices including those known in the art. The I/O controller can also provide interfaces for one or more output devices (e.g. speakers). The input/output devices 1417 are coupled through one or more I/O controllers 1415 as is known in the art. Additionally, one or more network interfaces 1425 can also be coupled to the one or more buses to provide access to one or more networks.

While FIG. 14 shows that the nonvolatile memory 1407 and the memory 1405 are coupled to the one or more buses directly rather than through a network interface, it will be appreciated that the data processing system can utilize a non-volatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 1409 may include one or more bridges or controllers or adapters to interconnect between various buses. In one embodiment, the I/O controller 1415 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 1405 or the non-volatile memory 1407 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The present invention can relate to an apparatus for performing one or more of the operations described herein. This apparatus may be specially constructed for the required purposes, or it may comprise a general-purpose computer selectively activated or reconfigured by a computer program stored in the computer. It will be apparent from this description that aspects of the present invention may be embodied, at least in part, in software. That is, the techniques may be carried out by an apparatus in a data processing system in response to a processor executing a sequence of instructions contained in volatile or non-volatile memory, or a combination of such memories, which together may embody a non-transitory machine readable storage medium.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry to implement the present invention. Thus the techniques are not limited to any specific combination of hardware circuitry and software, or to any particular source for the instructions executed by the data processing system associated an apparatus for performing one or more of the operations described herein.

What is claimed is:

1. A non-transitory computer-readable medium with instructions stored therein, the instructions, when executed by a processor, cause the processor to perform operations on a device, the operations comprising:
    retrieving and verifying a signed configuration file from a server;
    requesting a device specific communication session using the configuration file;
    receiving a payload from a network client configured to render web pages;
    signing the payload according to the configuration file; and
    sending the signed payload to the server.

2. The computer-readable medium of claim 1, wherein the communication session is application specific.

3. The computer-readable medium of claim 2, wherein the communication session is time-limited, and the application is a media purchasing application having an identifier that identifies the application and allows the application to be authenticated by the server.

4. The computer-readable medium of claim 1, wherein the signed payload is sent to the server via the network client configured to render web pages.

5. A non-transitory computer-readable medium with instructions stored therein, the instructions, when executed by a processor, cause the processor to perform operations, the operations comprising:
    presenting, in a first application on a device, one or more account creation forms;
    storing user-supplied data in the form;
    bundling the one or more forms into a message payload;
    sending the message payload to a second application on the device to be signed;
    receiving a signed bundle from the second application; and
    sending the signed bundle to an account creation server.

6. The computer-readable medium of claim 5, further comprising:
    requesting a locator for an electronic data form for creating an online store account;
    receiving, from the account creation server, a locator for the electronic data form; and
    retrieving, the electronic data form using the locator.

7. A non-transitory computer-readable medium with instructions stored therein, the instructions, when executed by a processor, cause the processor to perform operations on an account creation server, the operations comprising:
    receiving a request to create a secure session with a device;
    sending information for the secure session to the device;
    receiving a signed message to begin the secure session;
    verifying the signed message according to a configuration file stored on the account creation server;

sending the device a response containing an opaque server security token; and processing a request to create an online store account using timing heuristics to detect automated account creation.

8. The computer-readable medium of claim 7, wherein processing a request to create an online store account using timing heuristics to detect automated account creation comprises:

receiving one or more requests for a locator for one or more electronic data forms for creating an online store account and recording one or more timestamps for the one or more requests; and verifying one or more timestamps before sending a locator for the one or more electronic data forms.

9. The computer-readable medium of claim 8, wherein verifying one or more timestamps before sending a locator for the one or more electronic data forms comprises:

recording a timestamp of a request for a locator of a first electronic data form for creating an online store account;

recording a timestamp of a request for a locator of a second electronic data form for creating an online store account;

analyzing the timestamps for evidence of automated account creation activity; and rejecting the request for the locator of the second electronic data form if evidence of automated account creation activity is detected.

10. The computer-readable medium of claim 9, further comprising:

receiving a message with a payload comprising:
data from the one or more electronic data forms,
an opaque server security token, and
a message signature;

verifying the message signature using the opaque server security token; and creating an account using data from the one or more electronic data forms.

11. A non-transitory computer-readable medium with instructions stored therein, the instructions, when executed by a processor, cause the processor to perform operations at an electronic device, the operations comprising:

retrieving and verifying a signed configuration file from a server;

requesting a communication session using the configuration file;

receiving a message containing an opaque server security token;

using settings in the configuration file to verify the message containing the opaque server security token;

requesting authentication information from a user;

signing a message containing the authentication information according to the configuration file; and sending the message to the server.

12. The computer-readable medium of claim 11, wherein the opaque server security token enables the electronic device to authenticate with multiple servers without establishing a separate session with each server.

13. The computer-readable medium of claim 12, wherein the opaque server security token is at least partially encrypted.

14. A non-transitory computer-readable medium with instructions stored therein, the instructions, when executed by a processor, cause the processor to perform operations at an electronic device, the operations comprising:

creating a message with a purchase identifier and a vendor identifier associated with an item for purchase from an online store;

signing the message according to a server security configuration file;

sending the message and an opaque server security token to an online store receiving a signed receipt and an opaque server security token; and using settings in the configuration file to verify the signed receipt.

15. The computer-readable medium of claim 14 further comprising establishing a secure session with the online store.

16. The computer-readable medium of claim 15, wherein the secure session is a time-limited communication session.

17. A computer-implemented method at an electronic device comprising:

retrieving a signed configuration file from a server;

cryptographically verifying the signed configuration file from a server;

requesting a communication session using settings in the configuration file;

receiving a message payload from a network client configured to render web pages on the electronic device comprising data from one or more account creation forms with user-fillable data;

signing the message payload according to settings in the configuration file; and transmitting the signed message and payload to the server.

18. The computer-implemented method of claim 17, wherein the signed payload is transmitted to the server via the network client configured to render web pages.

19. A computer-implemented method at a data processing system used for account creation, the method comprising:

receiving a request to create a time-sensitive secure communications session with a device;

creating a secure session with an electronic device and sending information to begin the session to the device;

receiving a signed message to begin the time-sensitive secure session;

verifying the signed message according to a configuration file stored on the data processing system;

sending the device a response containing an opaque server security token;

receiving one or more requests for a locator for one or more account creation forms;

sending a locator for the one or more account creation forms;

receiving a message with a payload comprising:
data from the one or more account creation forms,
an opaque server security token, and
a message signature;

verifying the message signature using the opaque server security token; and creating an account using data from the one or more account creation forms.

20. The computer-implemented method of claim 19, further comprising:

recording a timestamp of a request for a locator of a first account creation form;

recording a timestamp of a request for a locator of a second account creation form;

analyzing the timestamps for evidence of automated account creation activity; and rejecting the request for the locator of the second account creation form if evidence of automated account creation activity is detected.

21. A computer-implemented method at an electronic device, the method comprising:
- establishing a secure session with an online store;
- creating a message with a purchase identifier and a vendor identifier associated with an item for purchase from the online store;
- signing the message according to a server security configuration file; and
- sending the message and an opaque server security token to an online store, the opaque server security token including server security state.

22. The computer-implemented method of claim 21, further comprising receiving a signed receipt and the opaque server security token.

23. The computer-implemented method of claim 22 further comprising using settings in the configuration file to verify the signed receipt.

24. A system comprising:
a device including memory and one or more processors operatively coupled with the memory, the one or more processors to process instructions stored in memory to:
- retrieve and verify a signed configuration file from a server;
- request a communication session using the configuration file, wherein the communication session is time-limited and specific to a media purchasing application having an identifier to identify the application and allow the application to be authenticated by the server;
- receive a payload from a network client configured to render web pages;
- sign the payload according to the configuration file; and
- send the signed payload to the server.

25. The system as in claim 24, wherein the communication session is specific to the device.

26. The system as in claim 24, wherein the processor is further to receive a message containing an opaque server security token and use settings in the configuration file to verify the message.

27. The system as in claim 26, wherein the opaque server security token includes server security state to enable authentication with multiple servers without establishing a separate session with each server.

28. The system as in claim 24, further comprising an account creation server, to:
- receive a request to create a secure session with the device;
- send information for the secure session to the device;
- receive a signed message to begin the secure session;
- verify the signed message according to a configuration file stored on the account creation server;
- send the device a response containing an opaque server security token; and
- process a request to create an online store account using timing heuristics to detect automated account creation.

* * * * *